July 14, 1925.
S. PULVERY
TROLLEY DEVICE
Filed June 21, 1922
1,545,572
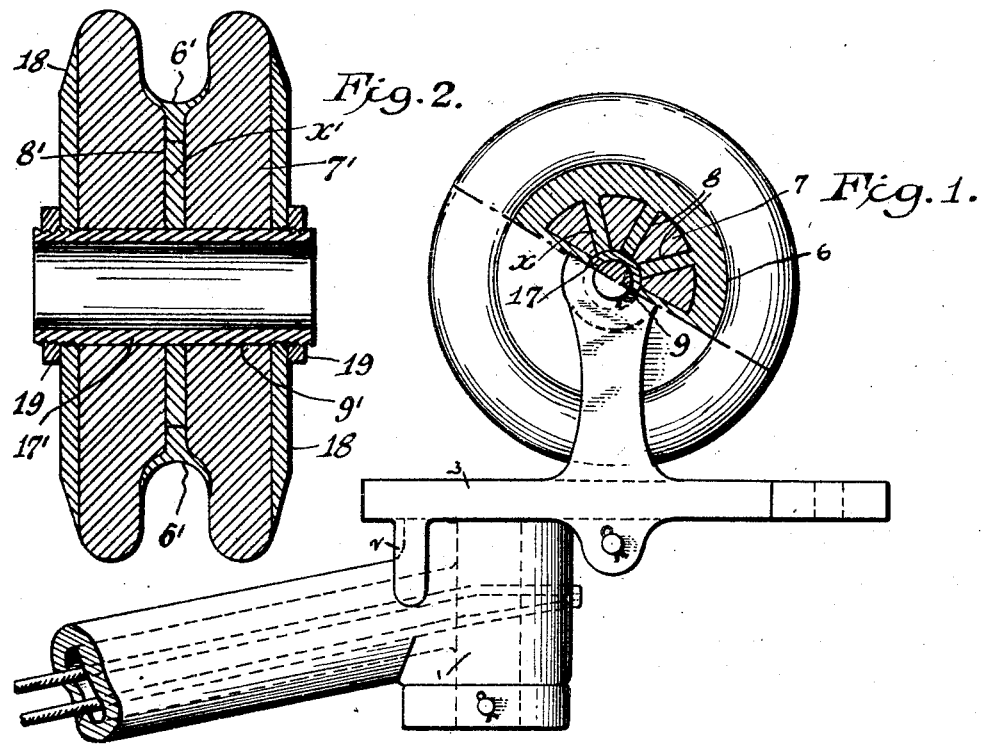
Inventor.
Stephen Pulvery Patented July 14, 1925.

1,545,572

UNITED STATES PATENT OFFICE.

STEPHEN PULVERY, OF McKEES ROCKS, PENNSYLVANIA.

TROLLEY DEVICE.

Application filed June 21, 1922. Serial No. 570,027.

*To all whom it may concern:*

Be it known that I, STEPHEN PULVERY, a citizen of the United States, residing at McKees Rocks, in the county of Allegheny and State of Pennsylvania, have invented a new and useful Trolley Device, of which the following is a specification.

The present invention relates to trolley wheels and trolley wheel retaining devices.

The object of the present invention is the provision of a very durable and efficient trolley wheel, the life of which is materially longer than that of ordinary wheels now in use; and in the provision of a simple and effective means permitting the trolley wheel to give with the normal movement of the trolley.

The invention further resides in the sundry details of construction, combination and arrangement of parts shown in the drawings and hereinafter referred to.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Referring in detail to the drawings which illustrate the invention in the embodiment in which it is at present devised:

Figure 1 is a side elevation of the trolley device of this invention, partly in section.

Fig. 2 is a vertical sectional view of a modified form of trolley wheel.

Similar and like characters indicate similar and like parts throughout the specification and drawings.

With particular reference to the drawings, 1 denotes bushings on the outer end of the trolley-pole with the opening therein extending generally vertical. A base 3 is pivotally mounted on the bushing by having a suitable shaft or bolt extending into the bushing. The pivotal movement of the base 3 is limited to about 45°, more or less, and in the present showing this is accomplished by lug 2 depending from the base and engageable with bushing 1, thus permitting the base, carrying the wheel, to pivot sufficiently as the wheel travels around curves and passes a switch, thereby reducing the tendency of the wheel to jump the trolley conductor. Spaced bearing arms 4 rise from the base 3 and support an axle or spindle 5 upon which the wheel 7 is mounted.

The wheel 7 is of porcelain material having a grooved peripheral edge 6 and radial passages 8 extending from the grooved periphery to the center opening 9.

The grooved edge 6 and the opening 9 are lined with metal and are electrically connected by means of the passages 8 which preferably are filled with metal. The metal used for this purpose may be copper, brass or a mixture thereof, or of other suitable metals.

The trolley wheel of this construction has greater longevity than others in common, and it has been found that it keeps cooler and is not as susceptible to burning out as ordinary all metal wheels.

In Figure 2 a modified construction of wheel is shown which is similar in all respects to the wheel shown in Fig. 1 except that side disks or plates 18 are in juxtaposition with opposite sides of the wheel to give strength to the latter. The plates are held in position by the bushing 17 being threaded at its ends and extending through the plates and receiving flat nuts 19 thereon. However, the plates 18 may be held in position in any other suitable manner.

Like parts of the modified construction of wheel shown in Figure 2 which are identical with those in the other view of the drawing are indicated by like reference characters raised by the exponent 1.

The current passes from the metal in the groove of the wheel through the metal spokes 8, embedded in the wheel to a suitable bushing at the center opening 9, through the axle 5, through the harp to suitable conductors as usually carried in the trolley pole.

What I claim as new and upon which Letters Patent are desired to be obtained is:

1. A trolley wheel of ceramic material and electric conducting material incorporated therein.

2. A trolley wheel of ceramic material and electric conducting material extending from the periphery of the wheel to the center thereof.

3. A trolley wheel having a center opening and a grooved periphery, comprising electric conducting material between the walls of the opening and the groove of the wheel, and a refractory ceramic material enveloping the wheel except at the groove and opening.

4. A trolley wheel having a center opening and a grooved periphery, comprising electric conducting material between the walls of the opening and the groove of the wheel, and a refractory ceramic material on opposite sides of the wheel.

5. A trolley wheel of porcelain having a peripheral groove and a central opening, said wheel having passages extending between the opening and groove, and a metallic material in said groove and in said passages.

6. A trolley wheel of porcelain having a peripheral groove and a central opening, said wheel having passages therein between said opening and groove and electrical conductive means in said passages.

7. In a trolley contact wheel the combination of porcelain and electrical conducting material.

8. A trolley wheel of porcelain, an electric conductive metal in said porcelain extending from the periphery thereof to a point of the wheel whereby electrical current can be taken therefrom.

9. A trolley wheel as set forth in claim 6 further characterized by reinforcing plates on opposite sides of the wheels and means for maintaining said plates in position.

STEPHEN PULVERY.